United States Patent [19]

Hatakeyama et al.

[11] Patent Number: 5,076,470

[45] Date of Patent: Dec. 31, 1991

[54] TUBE CONTAINER

[75] Inventors: Yoshiharu Hatakeyama, Tokyo; Tatsuo Ishikawa, Funabashi; Kenzo Teshima, Chiba, all of Japan

[73] Assignee: Yoshida Industry Co., Ltd., Tokyo, Japan

[21] Appl. No.: 490,728

[22] Filed: Mar. 8, 1990

[30] Foreign Application Priority Data

Jul. 26, 1989 [JP] Japan .................................. 1-191400
Nov. 9, 1989 [JP] Japan .................... 1-130107[U]

[51] Int. Cl.⁵ ............................................. B65D 35/28
[52] U.S. Cl. ..................................... 222/94; 222/132
[58] Field of Search ............... 222/94, 106, 107, 132, 222/566, 572, 145

[56] References Cited

U.S. PATENT DOCUMENTS

| | | | |
|---|---|---|---|
| 1,535,529 | 4/1925 | Hopkins | 222/94 |
| 1,639,699 | 8/1927 | Hopkins | 222/94 |
| 1,699,532 | 1/1929 | Hopkins | 222/94 |
| 2,297,690 | 10/1942 | Nitardy | 222/94 |
| 2,713,369 | 7/1955 | Strahm | 22/107 |
| 2,714,974 | 8/1955 | Sawyer | 222/132 |
| 2,935,231 | 5/1960 | Paull et al. | 222/94 |
| 2,939,610 | 6/1960 | Castelli | 222/107 |
| 2,959,327 | 11/1960 | Bloom | 222/94 |
| 3,135,428 | 6/1964 | Gallo | 222/94 |
| 3,227,319 | 1/1966 | Rosier | 222/94 |

FOREIGN PATENT DOCUMENTS

| | | | |
|---|---|---|---|
| 655134 | 4/1929 | France | 222/94 |
| 60-188150 | 12/1985 | Japan . | |
| 63-11091 | 4/1988 | Japan . | |
| 63-41339 | 10/1988 | Japan . | |
| 63-41340 | 10/1988 | Japan . | |
| 660714 | 6/1987 | Switzerland | 222/94 |
| 670612 | 6/1989 | Switzerland | 222/94 |

Primary Examiner—Donald T. Hajec
Assistant Examiner—Kenneth Bomberg
Attorney, Agent, or Firm—Wenderoth, Lind & Ponack

[57] ABSTRACT

A tube container of double or triple sleeve structure includes a molded nozzle having a neck and a shoulder formed integrally. An outer sleeve is welded to the shoulder of the molded nozzle. An inner sleeve also is welded to the molded nozzle. A mixing nozzle piece is fitted tightly to the internal circumferential surface of the molded nozzle. A first creamy content is filled into the internal lower space of the inner sleeve and a second creamy content is filled into the annular space between the inner and outer sleeves.

5 Claims, 8 Drawing Sheets

FIG. 12

TUBE CONTAINER

BACKGROUND OF THE INVENTION

This invention relates to a tube container, and more specifically to a tube container in which an outer sleeve having a larger diameter and an inner sleeve having a smaller diameter are coaxially arranged so as to contain different kinds or colors of creamy contents separately therein, and wherein both creamy contents be pressed out from a discharge opening and mixed with each other when they are consumed.

Such type of tube container is known as disclosed in Japanese Provisional Utility Model Publication No. 188150/1985 and Japanese Utility Model Publication Nos. 11091/1988, 41339/1988 and 41340/1988.

Each of these known tube containers is of a double sleeve structure in which an inner sleeve having an integrally formed neck and shoulder is disposed inside an outer sleeve also having an integrally formed neck and shoulder. There is provided a nozzle piece between the neck of the outer sleeve and that of the inner sleeve for discharging a first creamy content from the inner sleeve and a second creamy content from the outer sleeve as they are mixed therethrough.

Generally, for the fabrication of a tube container comprising a single sleeve having a shoulder and a neck at one end thereof, a sleeve is first shaped by extrusion molding, and then one end portion of the sleeve is placed in a die to form the shoulder and neck by injection molding.

Accordingly, for obtaining the above conventional tube container having the double sleeve structure, it is necessary to form the shoulder and the neck not only for the outer sleeve but also for the inner sleeve by injection molding. This means that the molding procedures required therefor are equivalent to those for forming at least two different sizes of tube containers. Between the so-formed neck of the inner sleeve and that of the outer sleeve is disposed a nozzle piece for discharging the first and second creamy contents as they are mixed therethrough. However, in the conventional tube container, since the bottom end of the nozzle piece is adapted to be fitted in the neck formed in the inner sleeve, the diameter of the discharge passage communicating with the first creamy content to be provided along the central portion of the nozzle piece in the inner sleeve is very much smaller than that of the neck of the inner sleeve, thus increasing the resistance to discharge of the first creamy content. On the other hand, when the diameter of the neck formed in the inner sleeve is enlarged so as to enlarge the diameter of the discharge passage along the central portion of the nozzle piece, the space defined between the nozzle piece and the neck of the outer sleeve becomes narrow, thus increasing the resistance to discharge of the second cream content.

Also, in the conventional tube container having a double sleeve structure of thermoplastic resin, the inner sleeve and the outer sleeve have substantially the same length, so that the lower ends of these inner and outer sleeves are terminated at substantially the same level. When the lower ends of the inner and outer sleeves are sealed, they are pinched and compressed in the radial direction by a heat sealing bar, for example, for welding of the thermoplastic resin. In such a case, since the inner sleeve has a smaller diameter than the outer sleeve, opposite external side portions of the outer sleeve are welded into two layers, while the middle part therebetween is welded into four layers. This results in a difference of thickness when welding the lower ends of both sleeves. Because of such difference of thickness, it has been difficult to homogenously seal the lower ends of the sleeves by a pair of sealing bars. Although there are some proposals which intend to compensate such difference of thickness, no satisfactory rotation yet has been provided.

SUMMARY OF THE INVENTION

Therefore, an object of the present invention is to provide a tube container which can discharge a first creamy content and a second creamy content as they are mixed therethrough with a small discharge resistance. Another object of the present invention is to provide a tube container having a double sleeve structure in which the lower open ends of the sleeves can be sealed satisfactorily by simple heat sealing bars. Another object of the present invention is to be able to fabricate the tube container using a more simple molding process than is conventional.

In order to achieve the above objects, a tube container according to the present invention comprises:

an extrusion nozzle having a neck and a shoulder integrally molded with each other, said nozzle also having a discharge opening at an upper end thereof;

a first outer sleeve integrally welded at an upper end portion thereof to an external circumferential portion of said shoulder on said extrusion nozzle;

a second inner sleeve having openings along an upper end portion thereof and also integrally welded at an upper end thereof to an internal circumferential portion of said shoulder on said extrusion nozzle;

a mixing nozzle piece projecting beyond the upper end of said inner sleeve and tightly fitted to an internal circumferential surface of said extrusion nozzle;

wherein said mixing nozzle piece has an annular flange tightly fitted to an internal circumferential surface of said inner sleeve at a position slightly below said openings formed through said inner sleeve, a first guide passage allowing the internal space of said inner sleeve to communicate with said discharge opening in said extrusion nozzle, and second guide passage allowing an annular space defined between said inner and outer sleeves to communicate with said discharge opening through said openings formed in said inner sleeve;

said inner sleeve being adapted to be filled with a first creamy content in the internal space thereof, while the annular space between said inner and outer sleeves being adapted to be filled with a second creamy content.

The above tube container according to this invention is fabricated by a method which comprises:

preforming an inner sleeve having openings along an upper end portion thereof, an outer sleeve having a larger diameter than said inner sleeve, and a mixing nozzle piece having a first guide passage, a second guide passage, a lower flange having a diameter substantially equal to the inner diameter of said inner sleeve and a trunk portion above said lower flange;

fitting said inner sleeve and said outer sleeve respectively on an inner core and an outer core with upper ends of said sleeves being extended above said respective cores, said outer core having an annular shape surrounding said inner core;

closing said inner and outer cores with an upper die to define therebetween a cavity for forming a neck and shoulder of said tube container, the inner diameter of the neck being substantially equal to the outer diameter at said trunk portion of said mixing nozzle piece;

injecting a molten thermoplastic resin into said cavity to form a molded nozzle and simultaneously to weld the upper end portions of the inner and outer sleeves integrally to the shoulder of said molded nozzle; and inserting said mixing nozzle piece from the lower open end of said inner sleeve to a level that said lower flange of said nozzle piece is directly below said openings in said inner sleeve and that said trunk portion of said nozzle piece tightly fits against the internal surface of the neck of said molded nozzle.

These and other objects, features and advantages of this invention will be more apparent from the following description of preferred embodiments, taken in conjunction with the accompanying drawings.

DESCRIPTION OF THE PREFERRED EMBODIMENTS

Preferred embodiments of this invention will be described below referring to the accompanying drawings.

Figure 1:
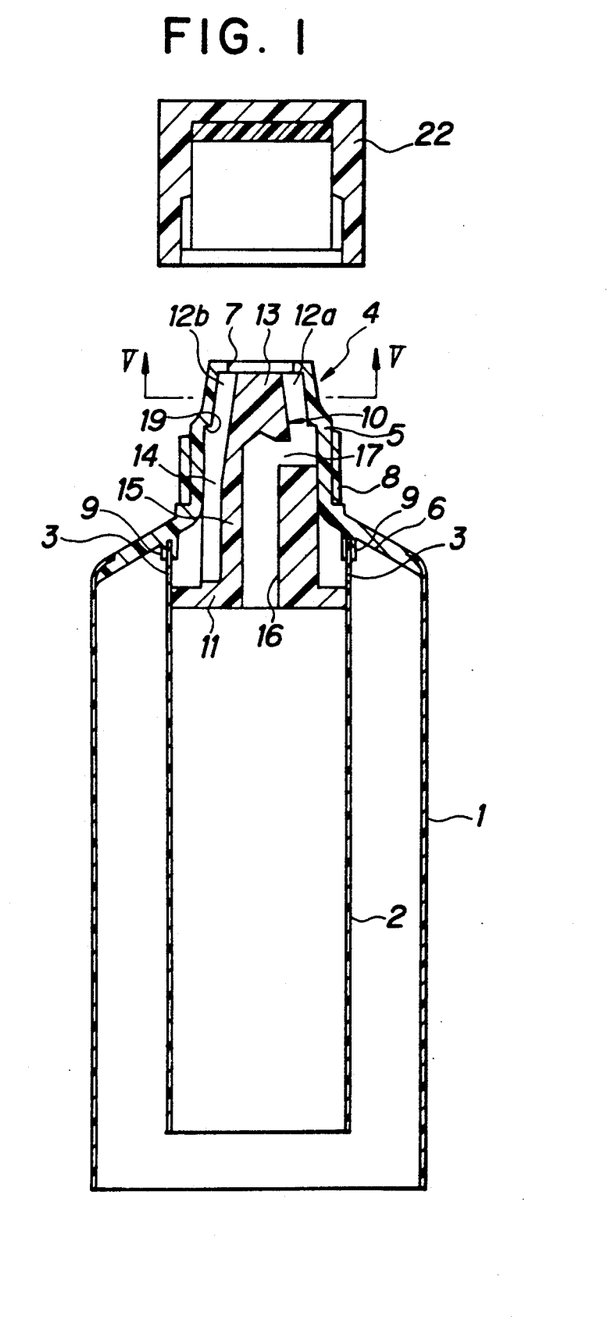
FIG. 1 is a vertical cross-sectional view of an unfilled tube container according to this invention, wherein a mixing nozzle piece is shown in cross-section taken along line I—I in FIG. 5.
Figure 2:
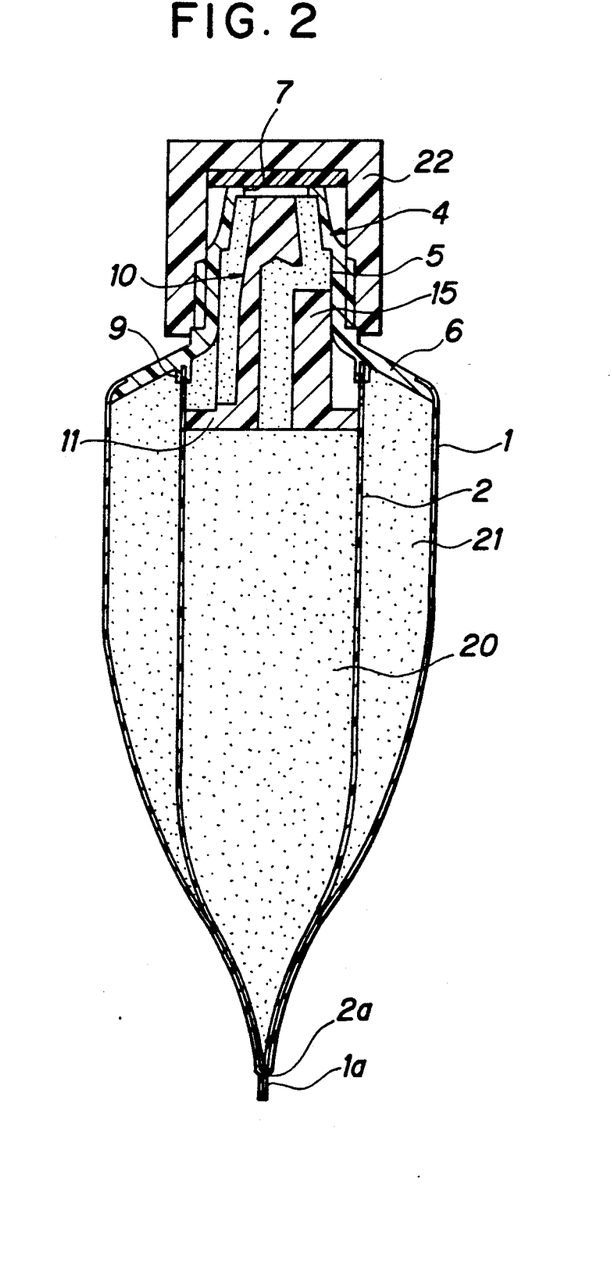
FIG. 2 is a vertical cross-sectional view of the same tube container according to this invention as shown in FIG. 1, in the finished state.

FIG. 1 and FIG. 2 each show a tube container according to a first embodiment of this invention, which is designed to contain two different kinds or colors of cosmetic materials separately and to discharge them as they are mixed when they are pressed therefrom.

Figure 3:
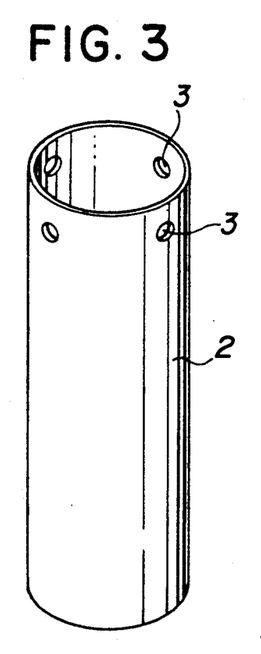
FIG. 3 is a perspective view of an inner sleeve.

The tube container has a cylindrical outer sleeve 1 having a large diameter and a cylindrical inner sleeve 2 having a small diameter. At the upper end portion of the inner sleeve 2, four through holes 3 are formed at regular intervals along the circumference, as shown in FIG. 3, and the length of the inner sleeve 2 is slightly shorter than that of the outer sleeve 1, so that the lower end of the inner sleeve 2 terminates at a level slightly higher than that of the outer sleeve 1. To the upper ends of inner and outer sleeves 1 and 2 is integrally molded a nozzle 4. The molded nozzle 4 comprises a neck 5 and a shoulder 6 formed integrally. The neck 5 has a discharge opening 7 at the top face thereof and a screw thread 8 along the lower circumference thereof. On the external circumferential end of the shoulder 6, the upper end portion of the outer sleeve 1 is integrally welded, and the upper end of the inner sleeve 2 is welded to a flange 9 formed along the internal circumferential surface of the shoulder 6 and slightly outwardly of the neck 5. A mixing nozzle piece 10 is contained in the neck 5 of the molded nozzle 4 above the inner sleeve 2.

Figure 4:
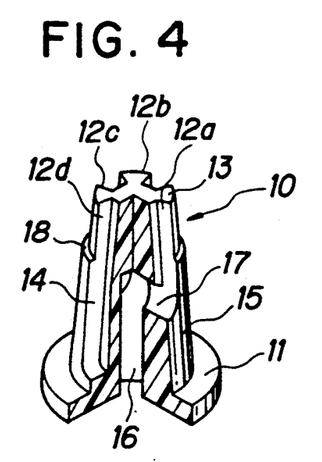
FIG. 4 is a partially cut-away perspective view of the mixing nozzle piece.
Figure 5:
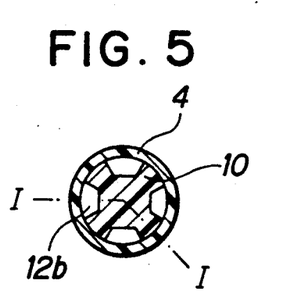
FIG. 5 is a cross-sectional view taken along line V—V in FIG. 1.

The mixing nozzle piece 10, as shown in the partially cut-away cross-sectional view of FIG. 4, has an annular flange 11 at the bottom end, a head 13 having four guide grooves 12a to 12d at the upper portion, and a trunk 15 having two guide grooves 14 at a portion intermediate between flange 11 and head 13. Along the axial line of the trunk 15, there is formed a vertical hole 16 having an open lower end and a closed upper end. At the upper end portion of the vertical hole 16, a lateral hole 17 is defined to penetrate horizontally the trunk portion 15, and the open ends of the lateral hole 17 communicate with two opposing of the guide grooves 12a and 12c. On the other hand, the remaining guide grooves 12b and 12d of the four are designed to be continuously vertically straight and contiguous with the two guide grooves 14 formed on the trunk 15. Incidentally, an annular shelf-like portion 18 is formed at a position between the head 13 and the trunk 15.

After the inner and the outer sleeves 1 and 2 and the nozzle 4 are integrally welded, the mixing nozzle piece 10 is inserted from the bottom open end of the inner sleeve 2, and pressed therein until the annular shelf-like portion 18 of the mixing nozzle piece 10 is abutted against an internal stepped portion 19 of the neck 5 of the molded nozzle 4. Thereby, the trunk 15 of the mixing nozzle 10 is tightly fitted onto the internal surface of the neck 5, and the annular flange 11 at the bottom end thereof is fitted in the inner sleeve 2 so as to expand the upper end portion of the inner sleeve 2, with the annular flange 11 being positioned below the through holes 3 formed along the upper edge of the inner sleeve 2.

After the mixing nozzle piece 10 is attached as mentioned above, a first creamy cosmetic material 20 is charged through the bottom opening of the inner sleeve 2, and a second creamy cosmetic material 21 is charged into the annular space defined between the inner sleeve 2 and the outer sleeve 1, followed by heat sealing of the bottom ends of the two sleeves 1 and 2 as shown in FIG. 2. As the first and second creamy cosmetic materials 20 and 21, there should be selected those which are of different colors or kinds and are preferably mixed only when they are consumed. A cap 22 is adapted to be screwed onto the molded nozzle 4 of the formed tube container to close the discharge opening 7 before the first and second cosmetic materials 20 and 21 are charged.

Reference is now made to a structure and method of sealing the lower end of the tube container. To seal the tube container as shown in FIG. 2, the lower end portion 1a of the outer sleeve 1 is pinched from opposite sides thereof by heat sealing bars (not shown) and welded to each other. At this time, only the lower end portion 1a of the outer sleeve 1 is pinched and welded. This becomes possible because the outer sleeve 1 is slightly longer than the inner sleeve 2, as shown in FIG. 1. When the lower end portion 1a of the outer sleeve 1 is welded as set forth above, although the lower end 2a of the inner sleeve 2 is not welded, it is firmly closed since the lower part of the inner sleeve 2 is pressed from opposite sides into a stable V-shape by the lower part of the outer sleeve 1 which is directly above the lower sealing end 1a.

The above sealing structure of the tube container is very simple because only the lower end portion of the outer sleeve 1 is welded and is satisfactorily accepted especially when the contents of creamy materials 20 and 21 have low fluidity and also when the inner and outer sleeves 1 and 2 have relatively high resiliency.

On the other hand, when the contents of the creamy materials 20 and 21 have relatively high fluidity or when the inner and outer sleeves 1 and 2 have relatively low resiliency, it is preferable also to weld the lower end portions of the inner sleeve 2 in addition to the above mentioned sealing structure.

Figure 6:
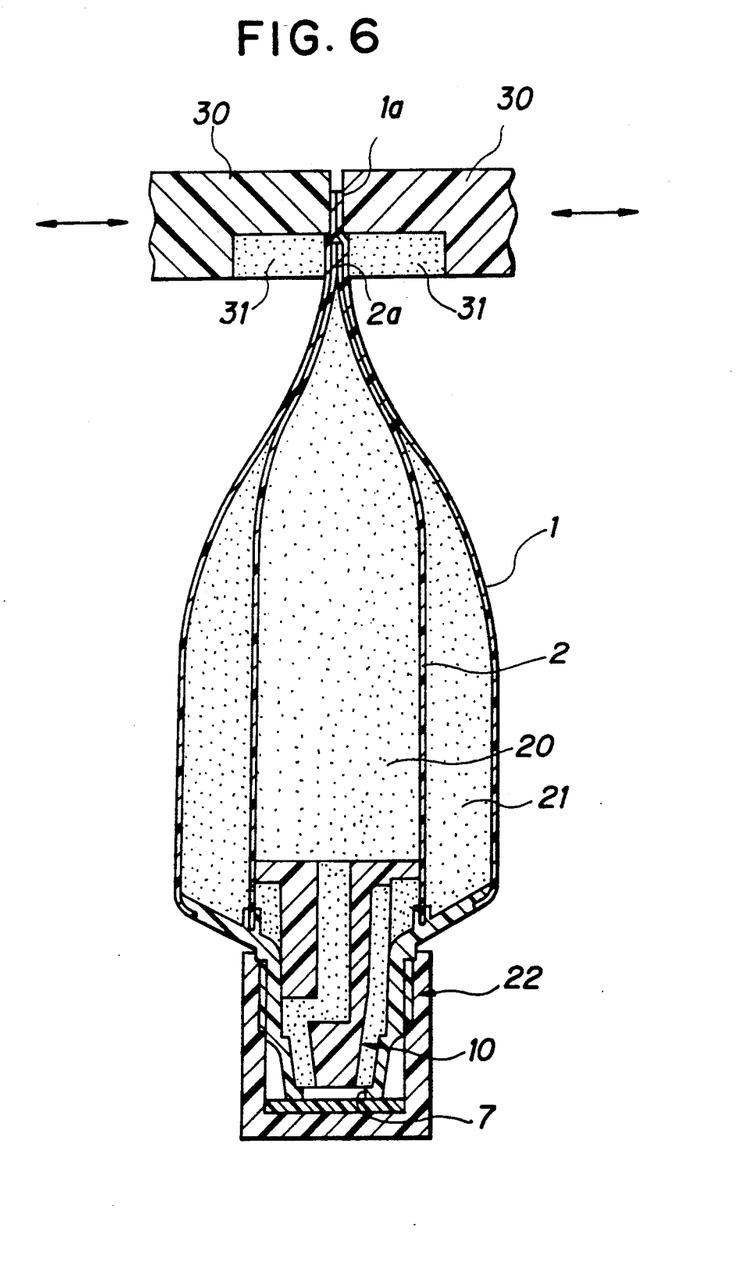
FIG. 6 is a cross-sectional view showing another type of heat sealing structure at lower open ends of the tube container.

In this case, the lower end portion 2a of the inner sleeve 2 is preheated by using a coil heater (not shown) or by hot air blown from the lower open end thereof. Then, as is shown in FIG. 6, the lower end portions 1a and 2a of the outer and inner sleeves 1 and 2, respectively, are pinched from opposite sides thereof by a pair of heat sealing bars 30. Each heat sealing bar 30 each has an elastic heat resisting rubber member 31 attached to the lower end corner thereof and arranged such that the rubber members 31 pinch the open end portion 2a of the inner sleeve 2 from the outside of the outer sleeve 1 and that the upper portions of the heat sealing bars 30 directly pinch the open end portion 1a of the outer sleeve 1.

In the sealing method set forth above, since the open end portion 2a of the inner sleeve 2 has been preheated, it is welded to close its opening when pinched by the heat sealing bars, but it is not welded to the outer sleeve 1. The outer sleeve 1 is only welded to close its opening at the open end portion 1a thereof.

When the tube container, sealed as shown in FIG. 2, is used, the external surfaces of the outer sleeve 1 are pressed between the fingers of a user. The first creamy cosmetic material 20 then enters the vertical hole 16 opening at the bottom end of the mixing nozzle piece 10, and passes through the lateral hole 17 and the guide grooves 12a and 12c at the head 13 to reach the discharge opening 7. On the other hand, the second creamy cosmetic material 21 passes through the through holes 3 formed along the upper edge of the inner sleeve 2, enters into the guide grooves 14 on the trunk 15 of the mixing nozzle piece 10 from the space above the annular flange 11, and then reaches the discharge opening 7 at head 13 through the guide grooves 12b and 12d vertically communicating directly with the guide grooves 14. Thereafter, the first and the second creamy cosmetic materials 20 and 21 are pressed out, as they are mixed, through the discharge opening 7 in a radial pattern.

Figure 7:
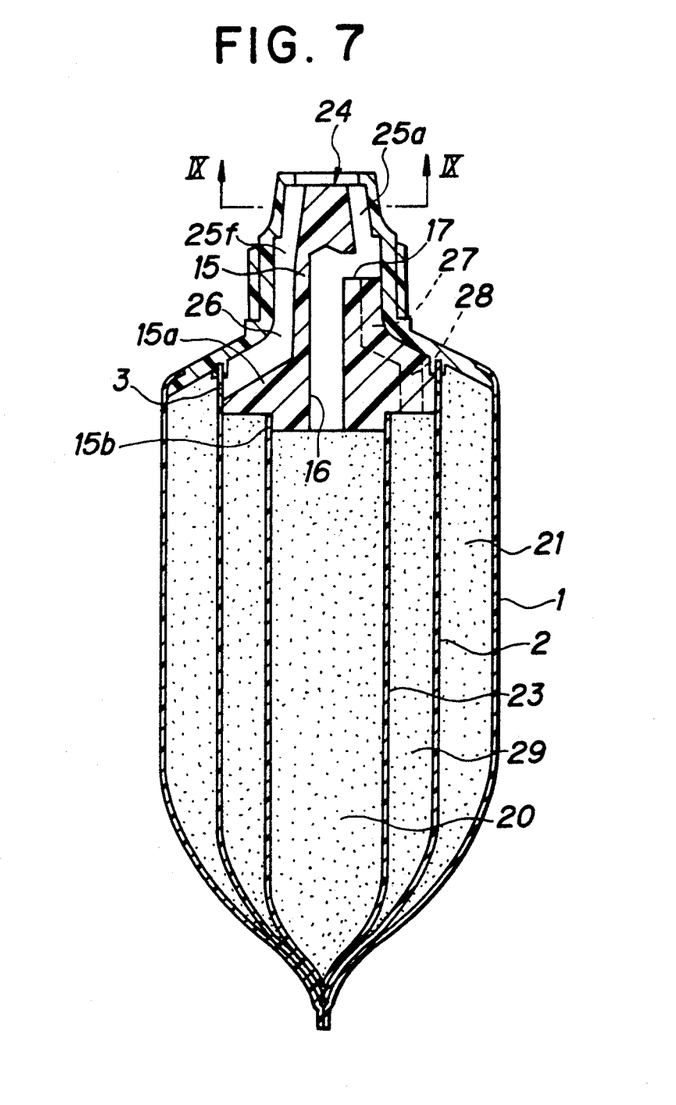
FIG. 7 is a vertical cross-sectional view of a tube container according to a second embodiment of this invention, wherein the mixing nozzle piece thereof is shown in cross section taken along line VII—VII in FIG. 9.
Figures 8, 9:
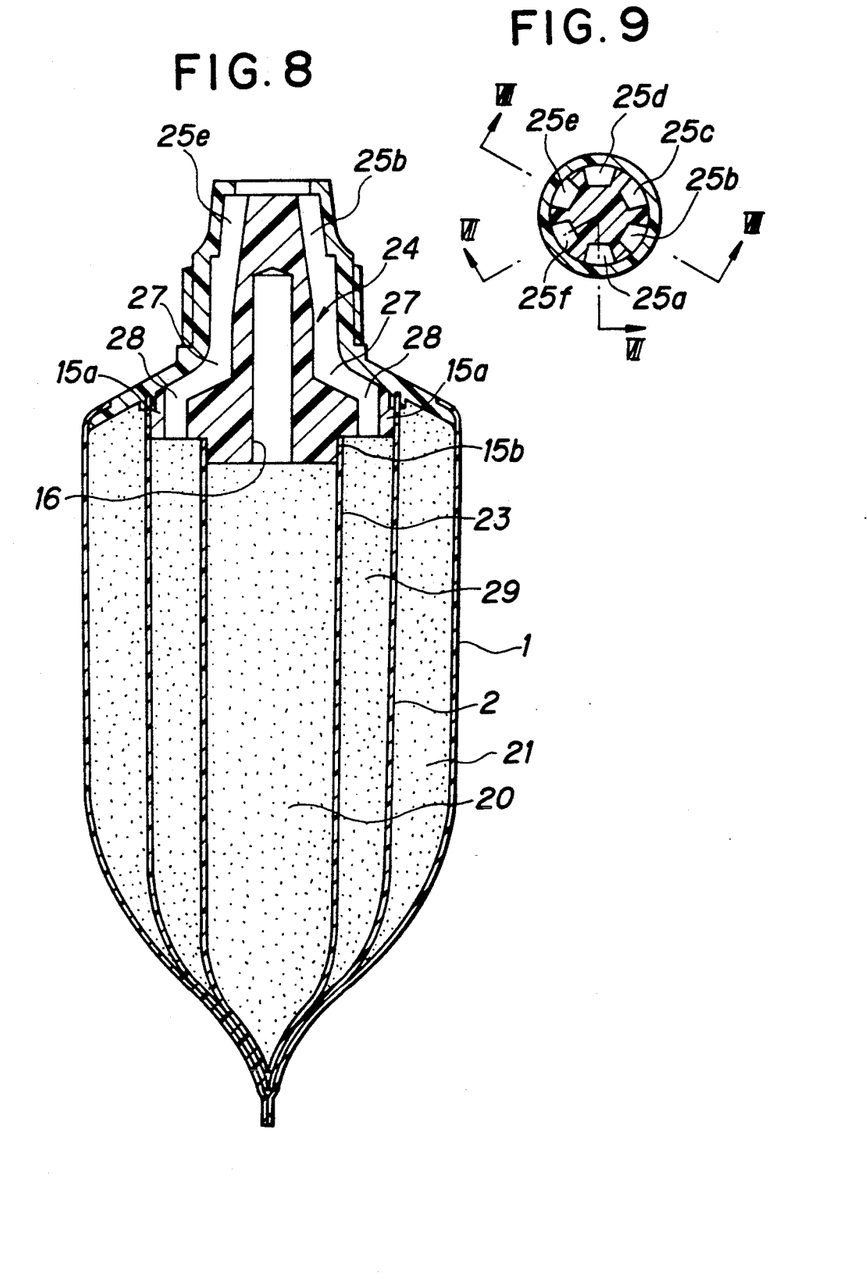
FIG. 8 is a vertical cross-sectional view of the same embodiment as FIG. 7, wherein the mixing nozzle piece thereof is shown in cross-sectional view taken along line VIII—VIII in FIG. 9.
FIG. 9 is a cross-sectional view taken along line IX—IX in FIG. 7.

FIGS. 7 and 8 each show a tube container according to the second embodiment of this invention, wherein the same members as those in the first embodiment will be designated by the same reference numerals, and only those aspects which are different from the first embodiment will be described below.

The tube container according to the second embodiment is intended for discharging three colors or kinds of creamy cosmetic materials as they are mixed, and comprises three sleeves 1, 2 and 23 respectively having large, medium and small diameters, while a mixing nozzle 24 has six guide grooves 25a to 25f along the circumference of the head 13 thereof as shown in FIG. 9. The two guide grooves 25a and 25d of the six are so arranged that they communicate with a first creamy cosmetic material 20 in the sleeve 23 of the small diameter through a central vertical hole 16 and the lateral hole 17 defined in the mixing nozzle 24 in the same manner as in the first embodiment. The two guide grooves 25c and 25f of the remaining four are so arranged that they communicate with a second creamy cosmetic material 21 through guide grooves 26 formed contiguously to the respective guide grooves 25c and 25f along the trunk 15 and the skirt 15a of the mixing nozzle piece 24 and through the through holes 3 formed along the upper end portion of the sleeve 2 of the medium diameter. The remaining two guide grooves 25b and 25e are so arranged that they communicate with a third creamy cosmetic material 29 contained in the space between the sleeve 2 of medium diameter and the sleeve 23 of small diameter through two guide grooves 27 formed contiguously to the guide grooves 25b and 25e on the trunk 15 of the mixing nozzle piece 24 and through two through holes 28 penetrating through the skirt 15a as shown in FIG. 8.

Incidentally, the coupling between the sleeve 23 of the small diameter and the mixing nozzle 24 is achieved by forcing the upper end portion of the sleeve 23 to fit on a bottom base portion 15b of the mixing nozzle piece 24.

In the tube container according to the second embodiment of this invention, as mentioned above, since each two of the guide grooves out of the six formed at the head of the mixing nozzle piece 24 communicate with the first, second and third creamy cosmetic materials 20, 21 and 29, respectively and separately, these three creamy cosmetic materials are guided as radially separated until they reach the top of the mixing nozzle piece 24, and are discharged from the discharge opening 7 as they are mixed by pressing the tube in such a way that the external surfaces of the sleeve 1 of the large diameter is pinched.

Figure 10:
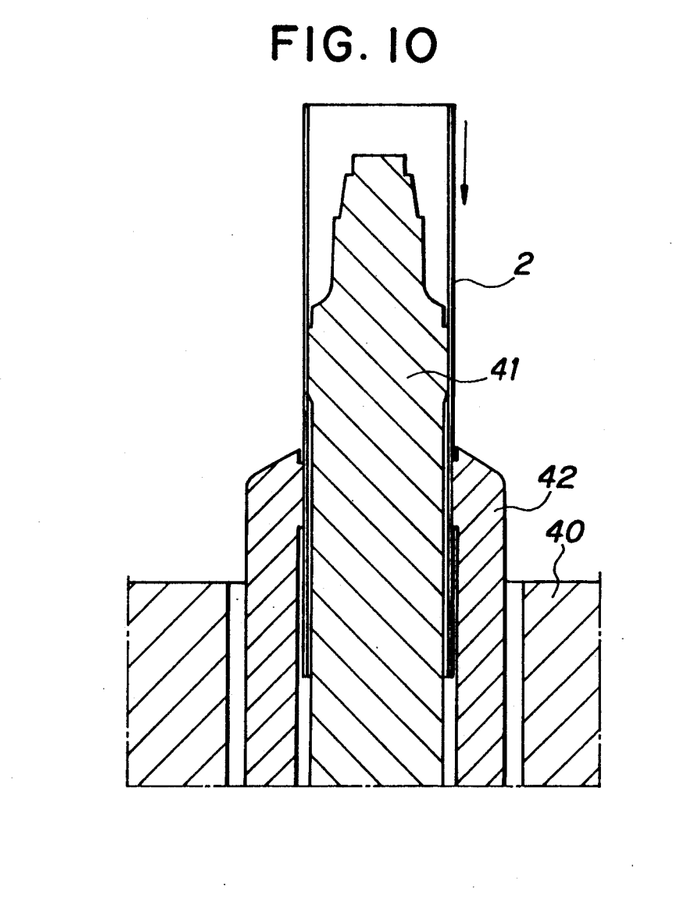
FIGS. 10 to 12 are cross-sectional views illustrating sequentially a process of fabricating the major section of the tube container according to this invention.
Figure 11:
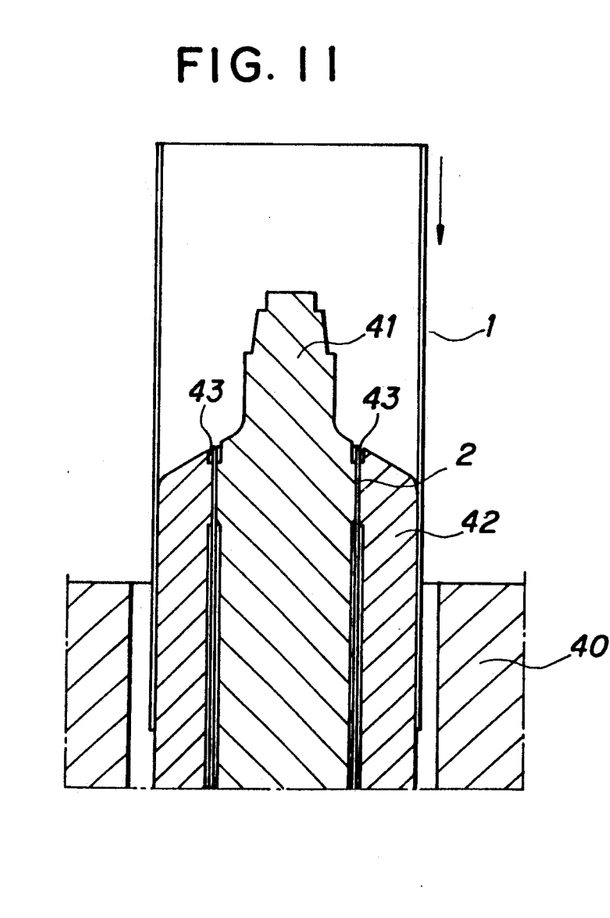
Figure 12:
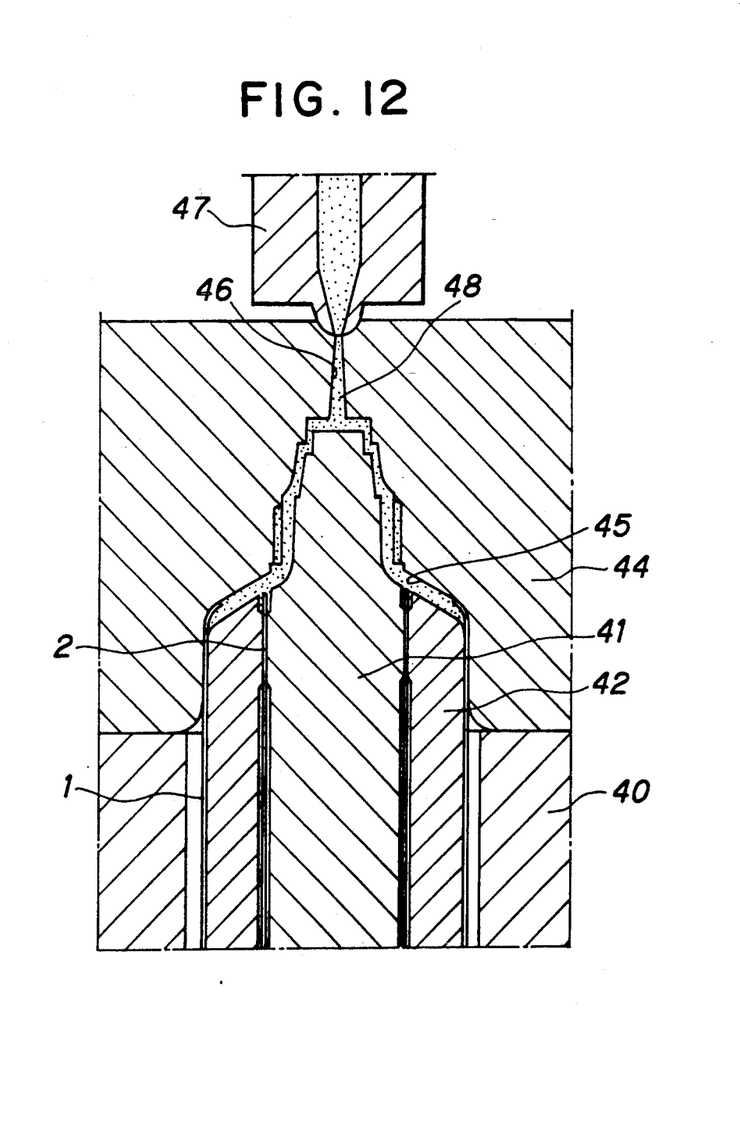

FIGS. 10 to 12 show a process of fabricating a tube container according to this invention. In a lower die 40, there are coaxially arranged an inner core 41 and an annular outer core 42 together defining the capacity of the tube container to be formed. Between the inner core 41 and the outer core 42, a space corresponding to the thickness of the inner sleeve 2 is provided, and the inner core 41 is movable relative to the outer core 42. When the inner sleeve 2 having through holes 3 along the upper end portion thereof is fitted on the inner core 41, the inner core 41 is first pulled out above its molding position for easier fitting as shown in FIG. 10, and the inner sleeve 2 is then fitted on the inner core 41 by pushing the inner sleeve 2 downwardly. Then, after the lower portion of the inner sleeve 2 is inserted into the space between the inner core 41 and the outer core 42, the inner core 41 is descended to push the inner sleeve 2 into the space between the cores 41 and 42 so that the inner sleeve 2 may be pulled down fully to a predetermined position after completion of the descending motion of the inner core 41.

As shown in FIG. 11, the external circumference at the shoulder of the inner core 41 and the internal circumference at the shoulder of the outer core 42 are partially notched to form an annular groove 43 together between the opposing edges of the cores 41 and 42. When the inner sleeve 2 is fully pulled down, the upper end of the inner sleeve 2 projects in the annular groove 43 by an amount height corresponding to the depth of the groove 43.

Then, as shown in FIG. 11, the outer sleeve 1 is fitted on the outer core 42 and pushed down as shown by the arrow. When the outer sleeve 1 is fully pushed down, the upper end portion of the outer sleeve 1 slightly projects above the top face of the shoulder of the outer core 42.

After completion of the fitting of the outer sleeve 1 and the inner sleeve 2, the cores 41 and 42 and the lower die 40 are closed with an upper die 44 as shown in FIG. 12, whereby a cavity 45 for forming a molded nozzle 4 as shown in FIG. 1 is defined between the cores 41, 42 and the upper die 44, and the upper end portion of the outer sleeve 1 is bent into tight contact with the internal surface of the upper die 44. A molten resin 48 is injected into cavity 45 from a nozzle 47 of a molding machine through a runner 46 of the upper die 44. After cooling and solidification of the resin, the upper die 44, lower die 40, core 41 and core 42 are separated, whereby the major section of the tube container is fabricated such that the molded nozzle 4 is integrally welded with the outer sleeve 1 and the inner sleeve 2, as shown in FIG. 1.

Subsequently, a discharge opening is formed at the top of the neck portion, and then a mixing nozzle piece 10 is fitted to the internal upper space of the inner sleeve 2 as described referring to FIGS. 1 to 5. A cap 22 is fitted on the molded nozzle 4, and for example, different colors of cosmetic materials are charged into the outer sleeve 1 and the inner sleeve 2 respectively. Then the lower end portions of the sleeves 1 and 2 are sealed, to obtain a finished and filled tube container.

Incidentally, while the inner core is designed to be movable relative to the outer core in the above embodiment, the inner core may be fixed in the state shown in FIG. 11, and the inner sleeve may be inserted in the space between the fixed inner core and the outer core. In this case, the insertion of the inner sleeve and the fitting of the outer sleeve onto the outer core may be conducted at the same time.

As stated above, in the tube container of this invention, not only the outer sleeve but also the inner sleeve are integrally welded to the molded nozzle having a neck and a shoulder integrally formed, so that it is not necessary to provide an inner sleeve with a neck and a shoulder separately from the molded nozzle for the outer sleeve, as has conventionally been practiced. Accordingly, the diameters of the peripheral passages and of the central passage in the mixing nozzle piece disposed in the molded nozzle can be increased to reduce the resistance when the creamy contents are pressed outwardly therefrom.

Moreover, in the method of this invention, it is not necessary to form a neck and a shoulder especially for the inner sleeve, because the upper end portions of the inner sleeve and the outer sleeve are integrally welded to the molded nozzle for the outer sleeve when the nozzle is injection-molded. Accordingly, this invention provides a simplified molding process and enables manufacture of the tube containers at a low cost.

Various modifications will become possible for those skilled in the art from the teachings of the present disclosure without departing from the scope thereof.

What is claimed is:

1. A tube container comprising:
   an extrusion nozzle having a neck and a shoulder integrally molded with each other, said nozzle also having at an upper end thereof a discharge opening;
   an outer first sleeve integrally welded at an upper end portion thereof to an external circumferential portion of said shoulder of said extrusion nozzle;
   an inner second sleeve having an upper end portion having openings therethrough, said inner second sleeve being integrally welded at an upper end thereof to an internal circumferential portion of said shoulder of said extrusion nozzle;
   a mixing nozzle piece projecting beyond said upper end of said inner second sleeve and tightly fitted against an internal circumferential surface of said extrusion nozzle, said mixing nozzle piece having an annular flange tightly fitted against an internal circumferential surface of said inner second sleeve at a position slightly spaced from said openings formed therethrough, a first guide passage communicating an internal space of said inner second sleeve with said discharge opening in said extrusion nozzle, and a second guide passage communicating an annular space defined between said inner and outer sleeves with said discharge opening through said openings formed in said inner second sleeve; and
   said inner second sleeve being adapted to have said internal space thereof filled with a first creamy content, and said annular space being adapted to be filled with a second creamy content.

2. A tube container as claimed in claim 1, wherein said mixing nozzle piece comprises a trunk portion spaced axially of said annular flange, said first guide passage extending along an axis of said trunk portion and said second guide passage extending along a periphery of said trunk portion, and said trunk portion being formed to tightly fit against an internal surface of said neck of said extrusion nozzle.

3. A tube container as claimed in claim 1, further comprising an innermost third sleeve integrally connected to a bottom base portion of said mixing nozzle piece, said mixing nozzle piece having a third guide passage communicating an internal space of said innermost third sleeve with said discharge opening in said extrusion nozzle, said innermost third sleeve being adapted to be filled with a third creamy content.

4. A tube container as claimed in claim 3, wherein said mixing nozzle piece comprises a trunk portion formed to tightly fit against an internal surface of said neck of said extrusion nozzle and a skirt portion defining said annular flange fitted against said internal circumferential surface of said inner second sleeve, said third guide passage extending along an axis of said trunk portion, said first guide passage extending through said skirt portion, and said second guide passage extending along a periphery of said trunk portion.

5. A tube container as claimed in claim 1, wherein said inner and outer sleeves are formed of plastic having relatively high resiliency, said outer sleeve is slightly longer than said inner sleeve, and a lower end portion of said outer sleeve directly beyond a lower end of said inner sleeve is welded by being pinched from opposite sides thereof and heated.

* * * * *